(12) United States Patent
Kim

(10) Patent No.: US 9,772,458 B1
(45) Date of Patent: Sep. 26, 2017

(54) OPTICAL MODULE FOR OPTICAL FIBERS AND METHOD OF MANUFACTURING THE SAME

(71) Applicant: Yottahn, Inc., Palo Alto, CA (US)

(72) Inventor: Hyogyeom Kim, Osan (KR)

(73) Assignee: Yottahn, Inc., Palo Alto, CA (US)

( * ) Notice: Subject to any disclaimer, the term of this patent is extended or adjusted under 35 U.S.C. 154(b) by 0 days.

(21) Appl. No.: 15/263,139

(22) Filed: Sep. 12, 2016

(51) Int. Cl.
*G02B 6/26* (2006.01)
*G02B 6/42* (2006.01)

(52) U.S. Cl.
CPC ........... *G02B 6/4214* (2013.01); *G02B 6/425* (2013.01); *G02B 6/428* (2013.01); *G02B 6/4239* (2013.01); *G02B 6/4243* (2013.01)

(58) Field of Classification Search
CPC .. G02B 6/4214; G02B 6/4239; G02B 6/4243; G02B 6/425; G02B 6/428
See application file for complete search history.

(56) References Cited

U.S. PATENT DOCUMENTS

| | | | | |
|---|---|---|---|---|
| 5,671,315 A * | 9/1997 | Tabuchi | ............... | G02B 6/4208 385/137 |
| 6,932,519 B2 * | 8/2005 | Steinberg | ............... | G02B 6/421 385/88 |
| 7,306,378 B2 * | 12/2007 | Alduino | ............... | G02B 6/4214 385/14 |
| 7,345,316 B2 * | 3/2008 | Sherrer | ............... | G02B 6/4201 257/432 |
| 7,729,581 B2 * | 6/2010 | Rolston | ............... | G02B 6/4232 385/49 |
| 8,899,847 B2 * | 12/2014 | Lin | ............... | G02B 6/4214 385/89 |
| 8,923,670 B2 * | 12/2014 | Zbinden | ............... | G02B 6/4214 385/33 |
| 9,134,490 B2 * | 9/2015 | Feng | ............... | G02B 6/4243 |
| 9,151,915 B2 * | 10/2015 | Castagna | ............... | G02B 6/4214 |
| 9,252,321 B2 * | 2/2016 | Goto | ............... | H01L 31/18 |
| 9,285,542 B2 * | 3/2016 | Barwicz | ............... | B29D 11/0075 |
| 9,423,569 B2 | 8/2016 | Son et al. | | |
| 2002/0028048 A1 * | 3/2002 | Dair | ............... | G02B 6/4214 385/92 |
| 2004/0184702 A1 * | 9/2004 | Hayamizu | ............... | G02B 6/12007 385/14 |
| 2004/0234205 A1 * | 11/2004 | Shimada | ............... | G02B 6/12002 385/50 |

(Continued)

FOREIGN PATENT DOCUMENTS

KR 10-1480025 B1 1/2015
KR 10-1502318 B1 3/2015

*Primary Examiner* — Thomas A Hollweg
*Assistant Examiner* — Guy Anderson
(74) *Attorney, Agent, or Firm* — McGuireWoods LLP

(57) ABSTRACT

An optical module is disclosed, which includes a substrate and an optical fiber bench attached to the substrate. The optical module also includes one or more optical fibers, each having an end placed on the optical bench. One or more optical devices are attached to the optical bench and in optical communication with the one or more fibers, respectively. An optical fiber alignment block is attached to the optical fiber bench with the one or more optical fibers therebetween. The optical fiber alignment block includes a reflecting surface that deflects an optical path between the one or more optical fibers and the one or more optical devices.

11 Claims, 7 Drawing Sheets

(56) References Cited

U.S. PATENT DOCUMENTS

| | | | | |
|---|---|---|---|---|
| 2005/0058408 | A1* | 3/2005 | Colgan | G02B 6/4214 385/89 |
| 2007/0258683 | A1* | 11/2007 | Rolston | G02B 6/4232 385/88 |
| 2008/0232737 | A1* | 9/2008 | Ishigami | G02B 6/4201 385/14 |
| 2009/0028575 | A1* | 1/2009 | Epitaux | G02B 6/4249 398/139 |
| 2009/0103864 | A1* | 4/2009 | Hamasaki | G02B 6/4239 385/31 |
| 2010/0215317 | A1* | 8/2010 | Rolston | G02B 6/4232 385/53 |
| 2011/0013866 | A1* | 1/2011 | Rosenberg | G02B 6/0096 385/14 |
| 2011/0075965 | A1* | 3/2011 | Demeritt | G02B 6/4214 385/14 |
| 2012/0020621 | A1* | 1/2012 | Zhou | G02B 6/4206 385/33 |
| 2013/0209027 | A1* | 8/2013 | Yu | G02B 6/12 385/14 |
| 2013/0209038 | A1* | 8/2013 | Pommer | G02B 6/424 385/76 |
| 2013/0308910 | A1* | 11/2013 | Nishimura | G02B 6/381 385/78 |
| 2014/0294352 | A1* | 10/2014 | Ertel | G02B 6/32 385/93 |
| 2015/0063760 | A1* | 3/2015 | Pommer | G02B 6/4251 385/79 |
| 2015/0338585 | A1* | 11/2015 | Li | G02B 6/423 385/31 |
| 2016/0274318 | A1* | 9/2016 | Vallance | G02B 6/428 |
| 2017/0031115 | A1* | 2/2017 | Schaevitz | G02B 6/4228 |
| 2017/0047312 | A1* | 2/2017 | Budd | G02B 6/4204 |
| 2017/0068056 | A1* | 3/2017 | Gappa | G02B 6/422 |
| 2017/0102503 | A1* | 4/2017 | Israel | G02B 6/30 |
| 2017/0108655 | A1* | 4/2017 | Zarbock | G02B 6/4214 |
| 2017/0131469 | A1* | 5/2017 | Kobrinsky | G02B 6/12004 |
| 2017/0131492 | A1* | 5/2017 | Vallance | G02B 6/4251 |
| 2017/0141533 | A1* | 5/2017 | Caer | H01S 5/0261 |

* cited by examiner

OPTICAL MODULE FOR OPTICAL FIBERS AND METHOD OF MANUFACTURING THE SAME

FIELD OF THE DISCLOSURE

The present disclosure relates to an optical module for optical fibers and a method manufacturing the same.

BACKGROUND OF THE DISCLOSURE

Since the introduction of diverse multimedia services, for example, high-definition (HD) and ultra-high-definition (UHD) media broadcasting and streaming services, an amount of data being transmitted via networks have surged, and there has been a growing need for sending and receiving a large amount of data. Due to the limited transmission capacity, data transmission via conventional copper wires is fading out, and data transmission based on optical fibers has become a mainstream in real life. Optical fibers allow broadband transmission and are free from interference by electromagnetic waves, and are widely used for transmission of a large amount of digital data.

An optical module device commonly refers to both a data receiving device, which converts an optical signal received via an optical fiber into an electronic signal, and a data transmitting device, which converts an electronic signal into an cal signal and transmits via an optical fiber. A poorly designed, constructed or produced optical module device is susceptible to optical signal loss in the process of transmitting and receiving signals. Accordingly, there is a need for an optical module device that does not suffer signal loss due to inferior design, construction and production.

SUMMARY OF THE DISCLOSURE

The present disclosure describes an optical module and a method of manufacturing the same, which may minimize loss of an optical signal and simultaneously reduce manufacturing cost by miniaturization, slimming, shortening, and lightening. The present disclosure also describes a method for manufacturing an optical module, which is simplified to reduce manufacturing cost. The present disclosure further describes an optical module and a method of manufacturing the same, in which an alignment tolerance between components is minimized.

According to an aspect of the present disclosure, an optical module includes a substrate; an optical fiber bench attached to the substrate; one or more optical fibers, each having an end placed on the optical bench; one or more optical devices attached to the optical bench and in optical communication with the one or more fibers, respectively; and an optical fiber alignment block attached to the optical fiber bench with the one or more optical fibers therebetween and including a reflecting surface that deflects an optical path between the one or more optical fibers and the one or more optical devices.

The optical module may further include an integrated circuit (IC) device disposed on the substrate and connected to the one or more optical devices.

The optical bench may include one or more mounting grooves formed at an upper surface of the optical bench, wherein the one or more optical fiber are placed one the one or more mounting grooves, respectively; a groove portion formed at a lower surface of the optical bench; and one or more through holes extending between the one or more mounting grooves and the groove portion, wherein the one or more optical devices are placed at the one or more through hole, respectively, in the groove portion.

The optical fiber alignment block may include one or more first holding grooves formed corresponding to the one or more mounting grooves, respectively, at a lower surface of the optical fiber alignment block; and an cal groove portion connected to the one or more first holding grooves and including the reflecting surface, wherein the reflecting surface faces cut surfaces of the one or more optical fibers.

The reflecting surface may be configured to deflect the optical path between the one or more optical fibers and the one or more optical devices at an angel of about 90°.

The optical bench may be formed of a silicon wafer. The optical fiber alignment block may be formed of a silicon wafer.

The optical bench may further include a plurality of first electrodes electrically connected to the IC device; a plurality of second electrodes formed at the groove portion and electrically connected to the one or more optical devices; and a plurality of wires extending between the plurality of first electrodes and the plurality of second electrodes, respectively.

The one or more optical devices may be electrically connected to the plurality of second electrodes, respectively, via flip-chip bonding.

The optical bench may include a first adhesive injection groove extending in a direction perpendicular to the mounting groove, and the optical fiber alignment block may include a second adhesive injection groove formed corresponding to the first adhesive injection groove of the optical bench.

In the optical fiber alignment block, the holding groove may be positioned lower than that the one or more optical groove portions, to form a step.

The optical module may further include an optical fiber fixing block attached to the lower surface of the optical fiber alignment block.

The optical bench may be longer than the optical fiber alignment block in a length direction of the optical fibers.

The optical fiber alignment block may further include a third adhesive injection groove. The optical fiber fixing block may include one or more second holding grooves formed corresponding to the one or more first holding grooves of the optical fiber alignment block; and a fourth adhesive injection groove formed corresponding to the third adhesive injection groove.

The optical module may further include an adhesive inserted into the first, second, third and fourth adhesive injection grooves.

According to another aspect of the disclosure, there is provided a method of manufacturing an optical module. A plurality of optical fibers is disposed at a plurality of first holding grooves, respectively, formed at a lower surface of an optical fiber alignment block. The lower surface of the optical fiber alignment block is attached to an upper surface of an optical bench. The upper surface of the optical bench includes a plurality of mounting grooves formed corresponding to the plurality of first holding grooves, respectively. An adhesive is injected via a first injection hole formed between the lower surface of the optical fiber alignment block and the upper surface of the optical bench.

The method may further include curing the injected adhesive.

The method may further include attaching a plurality of optical devices to the optical bench by flip-chip.

The method may further include attaching an upper surface of an optical fiber fixing block to the bottom surface of the optical fiber adjustment block. The optical fiber fixing block includes a plurality of second holding grooves formed corresponding to the plurality of first holding grooves of the optical fiber alignment block.

The method may further include injecting the adhesive via a second injection hole formed between the lower surface of the optical fiber alignment block and the optical fiber fixing block.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
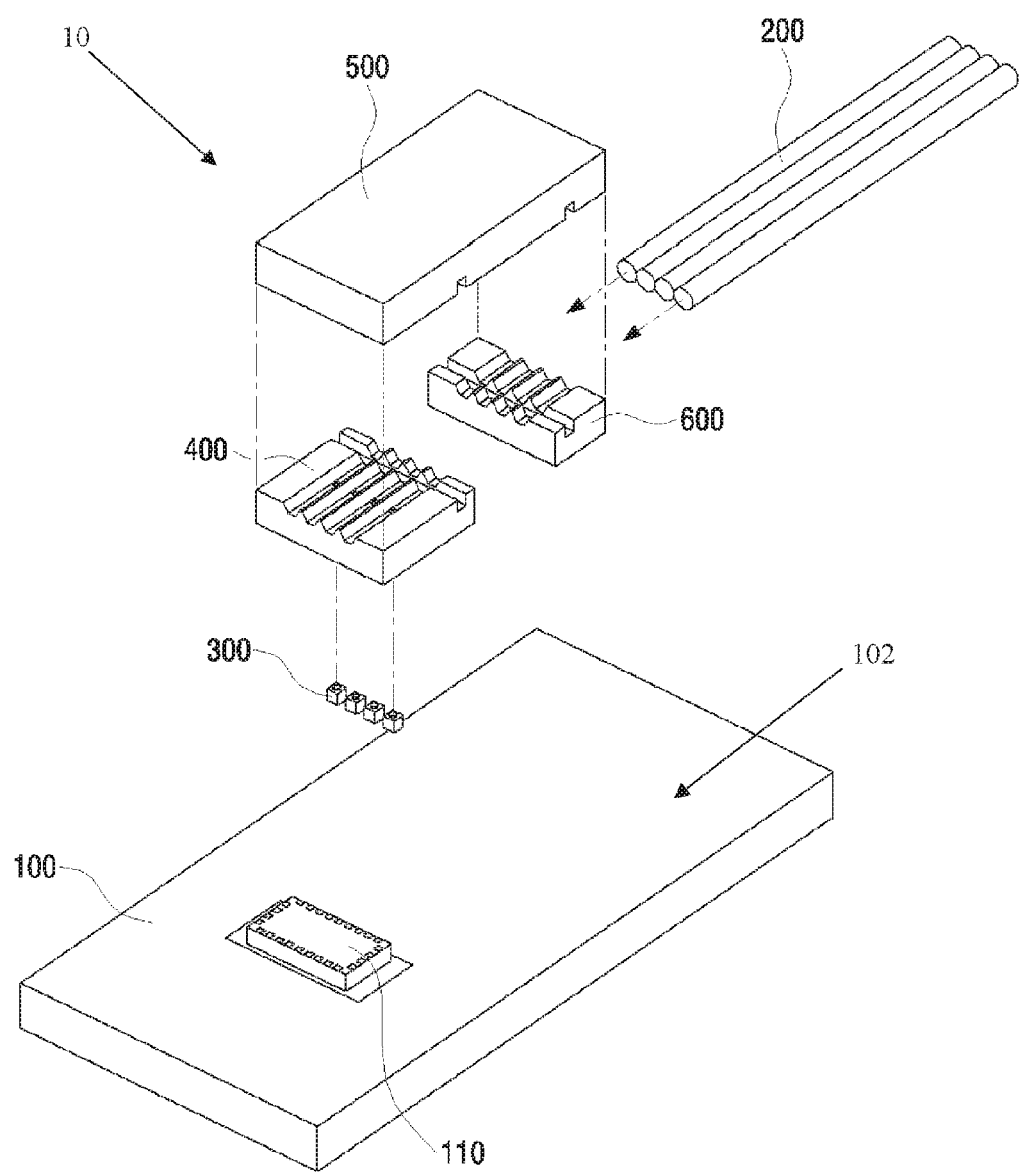
FIG. 1 is an exploded perspective view of an example of an optical module constructed according to principles of the disclosure.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 is an exploded perspective view illustrating an example of an optical module 10 constructed according to the principles of the disclosure.

As illustrated, the optical module 10 may include, for example, a substrate 100, one or more optical fibers 200 (four shown as an example), one or more optical devices 300, an optical bench 400, an optical fiber alignment block 500, an optical fiber fixing block 600, and/or the like. The optical fibers 200 may be fixed to the optical bench 400. The optical devices 300 may be attached to the optical bench 400. The optical fibers 200 and the optical devices 300 may be optically coupled at the optical bench 400. The optical fiber alignment block 500 may be coupled to the cal bench 400 to align the optical fibers 200. The optical fiber fixing block 600 may be coupled to the optical fiber alignment block 500 to fix the optical fibers 200.

The substrate 100 may, for example, be a printed circuit board (PCB) or the like. An integrated circuit (IC) device 110 may be disposed on an upper surface 102 of the substrate 100. The IC device 110 may be a circuit for driving the optical devices 300 or processing signals input from the optical fibers 200. When the optical module 10 is an optical transmitter, a vertical-cavity surface-emitting laser (VCSEL) driving IC for a light emitting device may be used for the IC device 110. When the optical module 10 is an optical receiver, a photo diode trans-impedance amplifier (TIA) for a light receiving device may be used for the IC device 110.

The optical fibers 200 may include at least one of a polymer optical fiber, a glass optical fiber, and/or the like. As illustrated in FIG. 1, the optical fibers 200 may be a ribbon type optical fiber bundle, in which a plurality of optical fibers are bundled in parallel.

The one or more optical devices 300 may operate as a light emitting device when the optical module 10 is air optical transmitter device, and may operate as a photo detector when the optical module 10 is an optical receiving device. A laser diode may be used for the light emitting device, and a photo diode may be used for the photo detector. A number of the optical devices 300 may depend on a number of the optical fibers 200. For example, when the optical fibers 200 is a ribbon slot type optical fiber in which four optical fibers are coupled (shown in FIG. 1), four optical devices 300 may be disposed corresponding to gaps between cores of the optical fibers 200.

Figure 2:
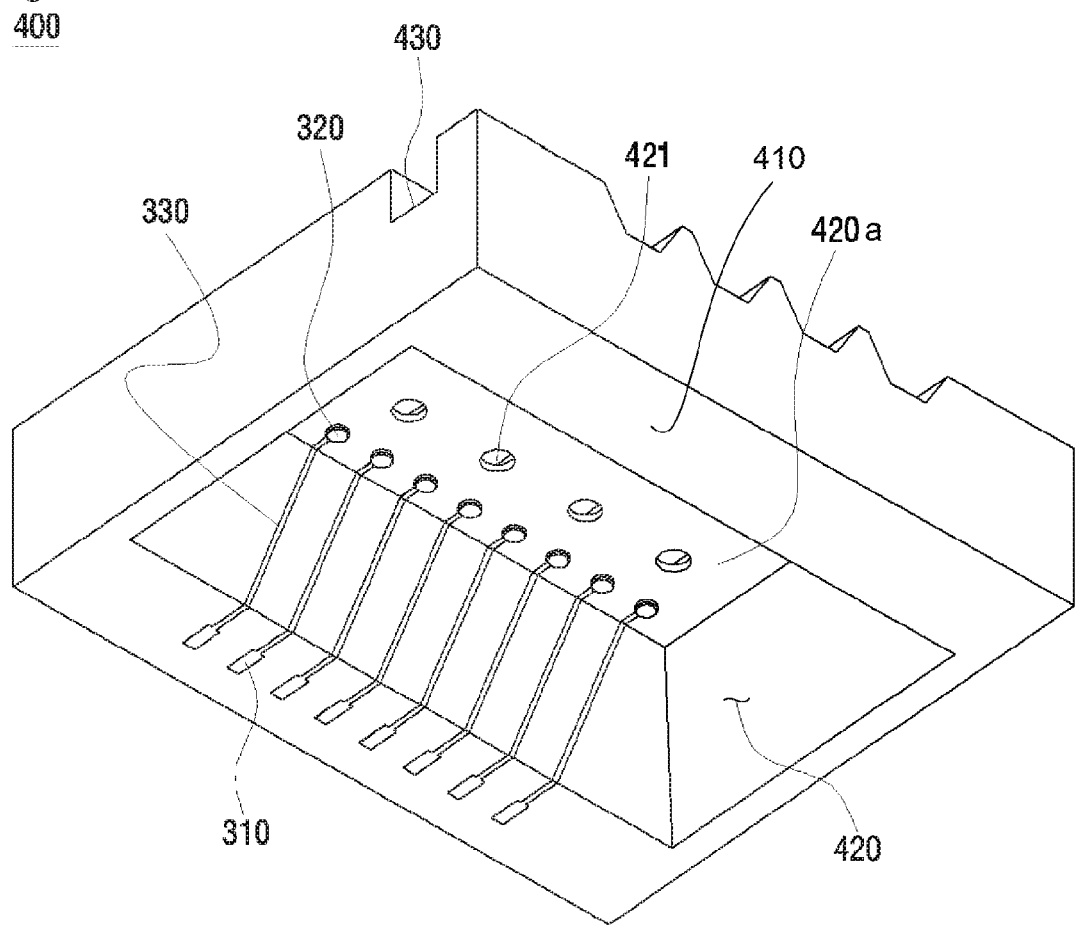
FIG. 2 is a bottom perspective view of an optical bench of the optical module illustrated in FIG. 1.
Figure 3:
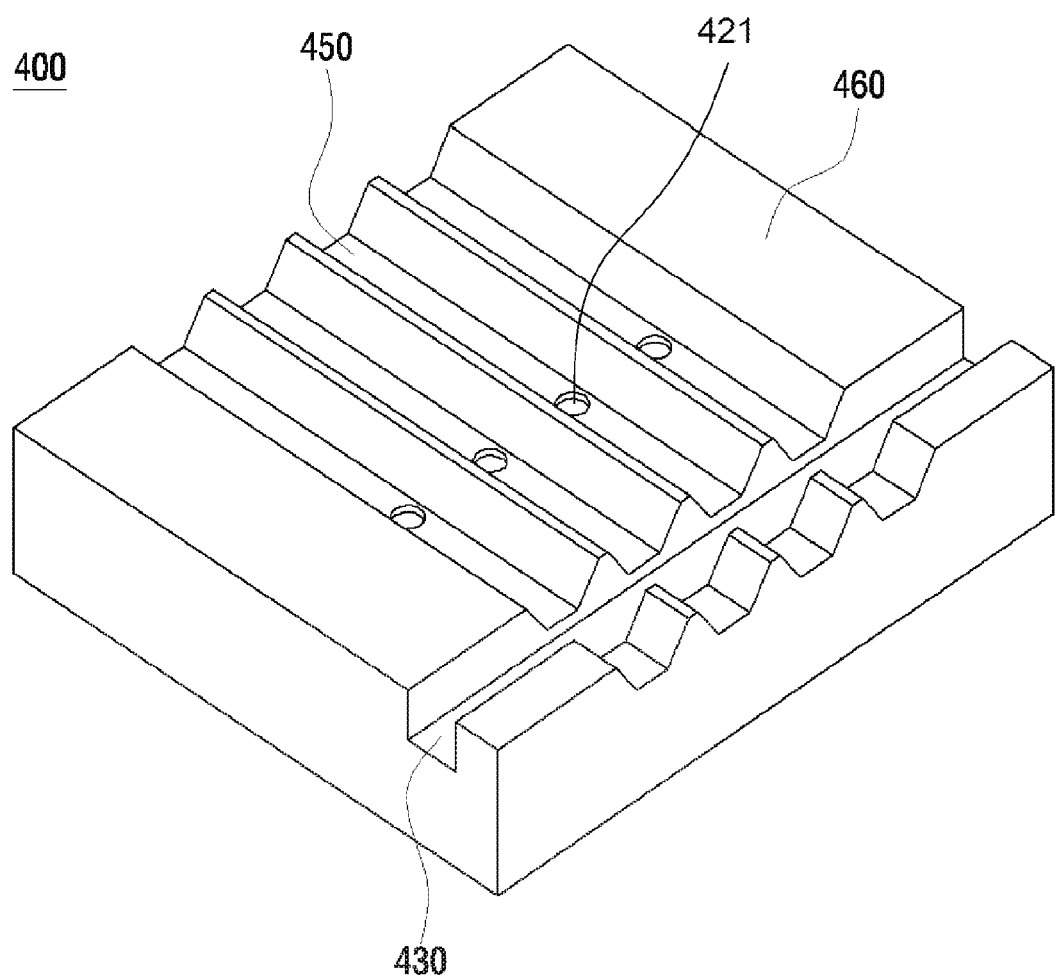
FIG. 3 is a top perspective view of the optical bench illustrated in FIG. 2.
Figure 4:
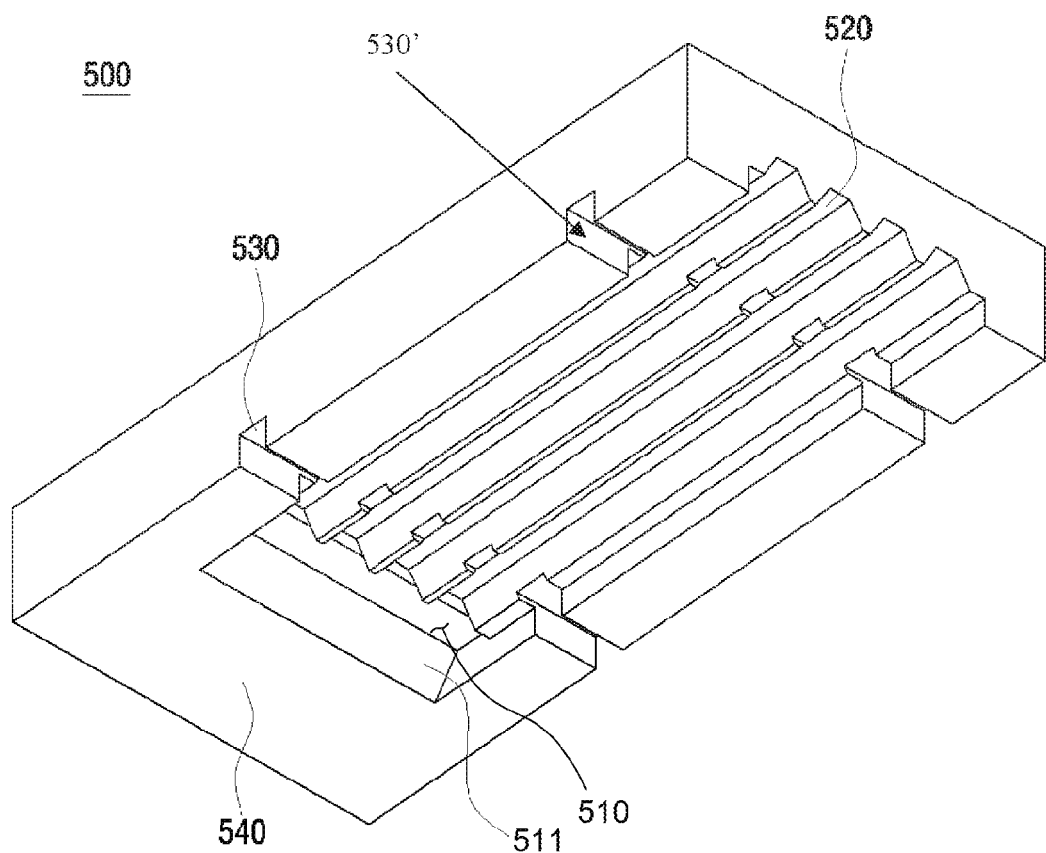
FIG. 4 is a bottom perspective view of an optical fiber alignment block of the optical module illustrated in FIG. 1.

FIGS. 2 and 3 respectively illustrate bottom and top perspective views of the optical bench 400 shown in FIG. 1. The optical bench 400 may include one or more mounting grooves 450 (four shown), which may be formed at an upper surface 460 thereof. The optical fibers 200 may be placed in the mounting grooves 450 in a length direction. A number of the mounting grooves 450 may correspond to a number of the optical fibers 200. For example, as shown in FIGS. 3 and 4, when four optical fibers 200 are bundled as a ribbon slot type optical fiber, four mounting grooves 450 may be formed.

The optical bench 400 may include a groove portion 420, which may be used for receiving the optical devices 300. The groove portion 420 may be formed at a lower surface 410 of the optical bench 400. The lower surface 410 may be in contact with the substrate 100. The groove portion 420 may longitudinally extend in a direction perpendicular to the mounting grooves 450. The groove portion 420 may be shaped to receive the optical devices 300. Once or more through holes 421 may be formed in a lower surface 420a of the groove portion 420 to accommodate physical connection between the optical fibers 200 and the optical devices 300. The through holes 421 may be spaced apart from each other and located at positions corresponding to optical paths of the optical fibers 200, which will be described below.

One or more first electrodes 310 may be formed on the lower surface 410 of the optical bench 400. The first electrodes 310 may be electrically connected to the IC device 110. One or more second electrodes 320 may be formed on the lower surface 420*a* of the groove portion 420, for example, adjacent to the through holes 421. The second electrodes 320 may be electrically connected to the optical devices 300, respectively. Once or more wires 330 may extend between the first electrodes 310 and the second electrodes 320, respectively. The optical devices 300 may be respectively placed at the through holes 421 of the lower surface 420*a* of the groove portion 420. The optical devices 300 may be electrically connected to the second electrodes 320, using, for example, a flip-chip bonding process or the like. On the upper surface 460 of the optical bench 400, an adhesive injection groove 430 may be formed, which may extend in a direction perpendicular to the mounting grooves 450, for injecting, for example, resin or the like.

The optical bench 400 may be formed of a substrate material, such as, for example, silicon (Si), silicon dioxide (SiO$_2$), germanium (Ge), germanium arsenic (GeAs) compounds, and/or the like. For example, the optical bench 400 may be formed with a Si wafer having a crystal orientation [100]. The optical bench 400 may be formed by dicing a Si water. The optical bench 400 may be produced using, for example, a wafer level packaging (WLP) process or the like. More specifically, the mounting grooves 450 and the groove portion 420 may be formed at a wafer level by forming a V-groove through a wet etching process using an etchant. The through holes 421 may be formed by, for example, a dry etching process or the like. The first electrodes 310, the second electrodes 320, and the wires 330 may be formed at the wafer level by, for example, an electrode patterning process using a mask or printing process or the like. The first electrodes 310 and the second electrodes 320 may be formed by, for example, adding a solder ball, a solder bump, a solder pad, or the like, to the lower surface 410 of the optical bench 400 and the lower surface 420*a* of the groove portion 420. The adhesive injection groove 430 may be formed by, for example, a wafer-level packaging (WLP) process, or using, for example, a dedicated sawing apparatus or the like, after dicing. By using the WLP process with a Si wafer, the optical bench 400 may be constructed with micrometer-scale accuracy.

FIG. 4 is a bottom perspective view of the optical fiber alignment block 500 shown in FIG. 1. As illustrated, one or more optical fiber holding grooves 520 may be formed at a lower surface 540 of the optical fiber alignment block 500. The optical fiber alignment block 500 and the optical fiber holding grooves 520 may longitudinally extend in the length direction. One end of each optical fiber holding grooves 520 may extend to a side end portion of the optical fiber alignment block 500, and the other end may extend to a position at which an end portion of the optical fibers 200 is to be disposed. The optical fiber holding grooves 520 may be shaped to engage the mounting grooves 450 of the optical bench 400, respectively, to fix the optical fibers 200 therebetween.

An optical groove portion 510 may be formed in the lower surface 540 of the optical fiber alignment block 500 at a location where the through holes 421 are disposed when the optical fiber alignment block 500 is attached to the optical bench 400. The optical groove portion 510 may longitudinally extend substantially perpendicular to the optical fiber holding grooves 520. A reflecting surface 511 may be formed in the optical groove portion 510 to deflect an optical path by about 90°. The reflecting surface 511 may be positioned to face the end portions of the optical fibers 200 mounted at the holding grooves 520. The reflecting surface 511 may be formed at an angle of about 45° for optical efficiency. When a wet etching process is performed in a Si wafer having a crystal orientation [100], the reflecting surface 511 may be formed at the angle of 54.7°. A high reflector coating may be applied onto the reflecting surface 511. The reflecting surface 511 may be coated with, for example, gold, silver, aluminum, or the like. The reflecting surface 511 may be coated with gold to improve the reflectance. One or more adhesive injection grooves 530, 530' may be formed in the lower surface 540 of the optical fiber alignment block 500 in a direction perpendicular to the holding grooves 520.

The optical fiber alignment block 500 may be formed of a substrate material, such as, for example, silicon (Si), silicon dioxide (SiO$_2$), glass, or the like. The optical fiber alignment block 500 may be formed of a Si wafer having a crystal orientation [100], which may provide accurate passive alignment with the optical bench 400. The optical fiber alignment block 500 may be formed by, for example, dicing a Si wafer or the like. The optical fiber alignment block 500 may be formed by, for example, the WLP process or the like. More specifically, the optical groove portion 510 and the optical fiber holding grooves 520 may be formed at a wafer level by forming a V-groove through, for example, a wet etching process or the like, using an etchant.

The reflecting surface 511 may be formed at an angle of about 54.7° by, for example, performing a wet etching process or the like. The reflecting surface 511 may be formed at an angle of about 45° by performing a wet etching process while controlling concentration and additives of the etchant after aligning an etch mask along the crystal orientation [100]. The adhesive injection grooves 530, 530' may also be formed by, for example, performing a WLP process or the like, and may be formed using, for example, a dedicated sawing apparatus or the like, after dicing. Using a WLP process with a Si wafer, the optical fiber alignment block 500 may be produced with micrometer-scale accuracy.

Figure 5:
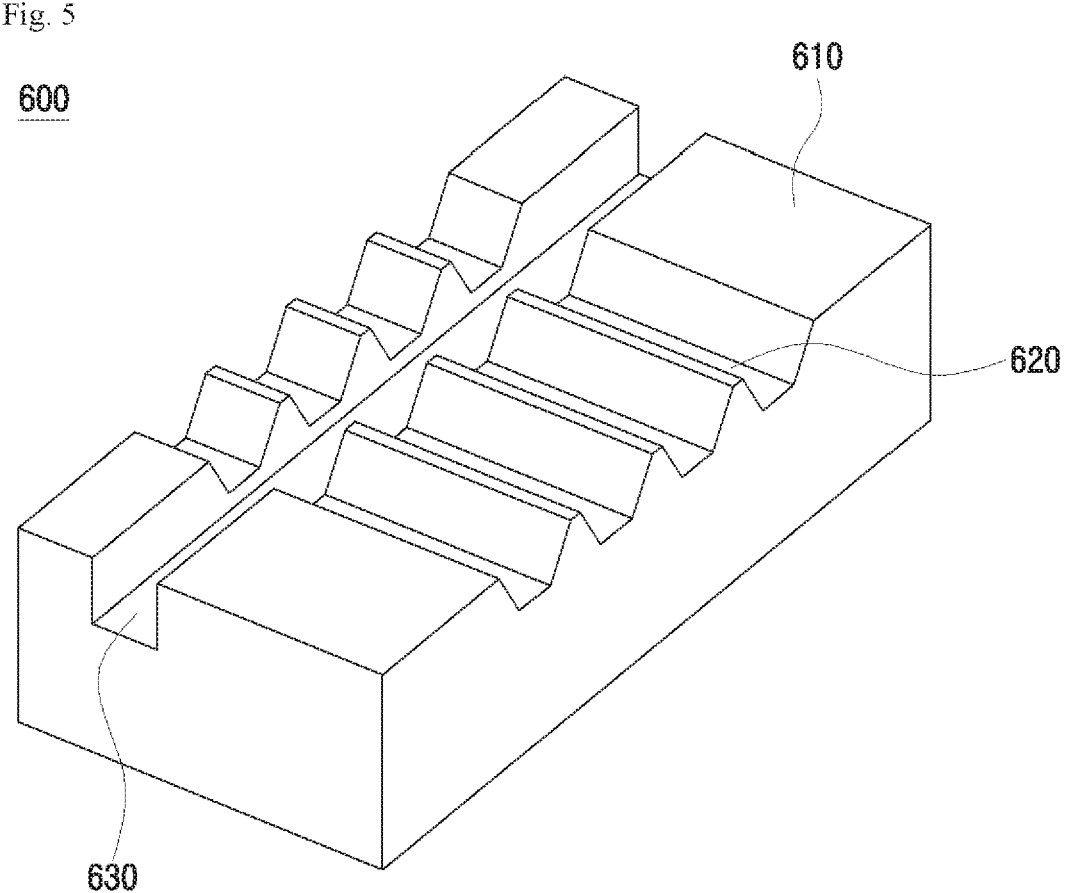
FIG. 5 is a top perspective view of an optical fiber fixing block of the optical module illustrated in FIG. 1.

FIG. 5 is a top perspective view of the optical fiber fixing block 600 shown in FIG. 1. Referring to FIG. 1, in order to reduce the manufacturing cost, the optical bench 400 may be produced to be shorter than the optical fiber alignment block 500. The optical fiber fixing block 600 may be separately produced and then coupled to the optical fiber alignment block 500 to fix the optical fibers 200. The optical fiber fixing block 600 may be shaped to engage the optical fiber alignment block 500. More specifically, the optical fiber fixing block 600 may include one or more holding grooves 620 formed at an upper surface 610. The holding grooves 620 may have a shape corresponding to the optical fiber holding grooves 520. An adhesive injection groove 630 may be formed at a location corresponding to the adhesive injection groove 530'. The adhesive injection groove 630 may be shaped corresponding to the adhesive injection groove 530'.

The optical fiber fixing block 600 may be formed of, for example, silicon (Si), silicon dioxide (SiO$_2$), glass, or the like. The optical fiber fixing block 600 may be formed of a Si wafer having a crystal orientation [100], which may provide accurate passive alignment with the optical fiber alignment block 500. The optical fiber fixing block 600 may be formed by, for example, dicing a Si wafer or the like. The optical fiber fixing block 600 may be formed via, for example, a WLP process or the like. More specifically, the holding grooves 620 may be made at a wafer level by forming a V-groove through, for example, a wet etching process or the like, using an etchant. The adhesive injection groove 630 may be formed using, for example, a WLP process or the like, and may be formed using, for example, a dedicated sawing apparatus or the like, after dicing. Using a WLP process with a Si water, the optical fiber fixing block 600 may be produced with micrometer-scale accuracy.

Figure 6:
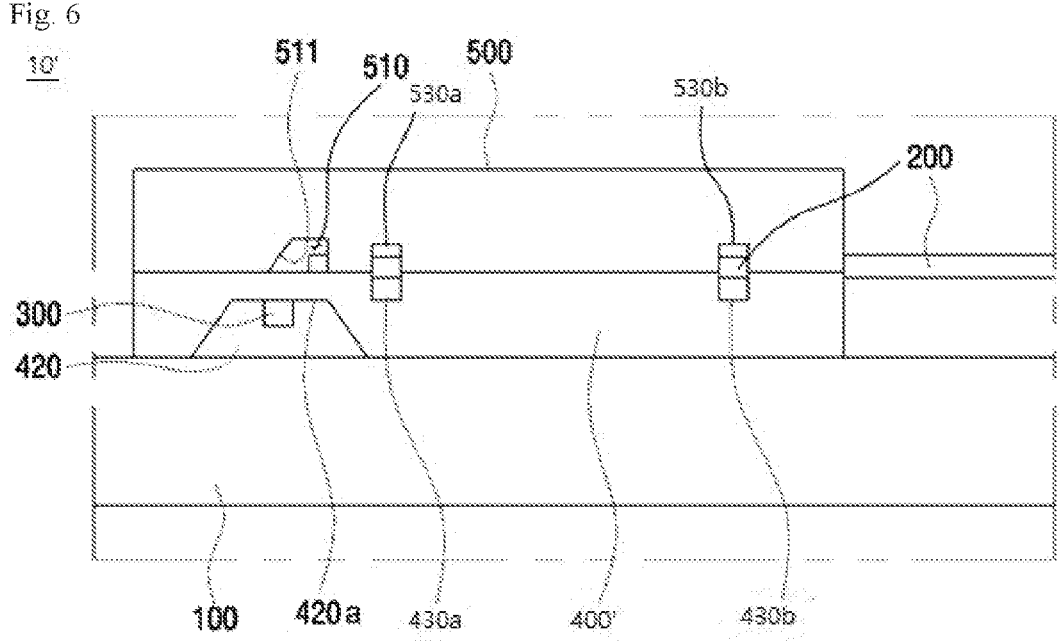
FIG. 6 is a partial side view of another example of an optical module constructed according to another embodiment of the present disclosure.

FIG. 6 is a partial side view illustrating an optical module 10', which is another example constructed according to the principles of the disclosure. As illustrated in FIG. 6, an optical bench 400' may be formed to have the same size as the optical fiber alignment block 500. More specifically, the optical bench 400 may have the same length, width and height as the optical fiber alignment block 500. Therefore, the optical fiber fixing block 600 shown in FIGS. 1 and 6 may not be necessary. The optical bench 400' may have two adhesive injection grooves 430a and 430b, which may be formed at the locations corresponding to the adhesive injection grooves 530a and 530b, respectively.

Figure 7:
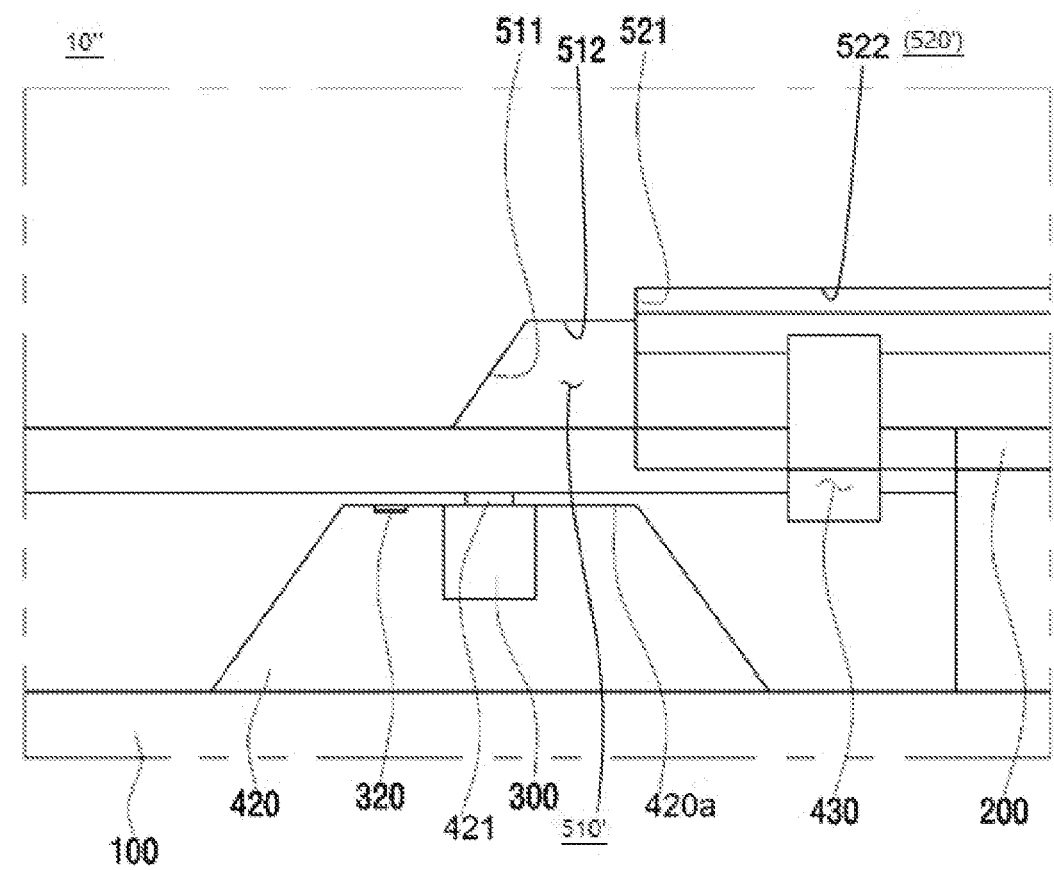
FIG. 7 is a partial side view of yet another example of an optical module constructed according to the principles of the disclosure.

FIG. 7 is a partial side view illustrating a part of an optical module 10", which is yet another example constructed according to the principles of the disclosure. As illustrated in FIG. 7, a lower surface 522 of an optical fiber holding grooves 520' may be formed to be lower than that of a lower surface 512 of an optical groove portion 510' to form a step 521 at one end of the optical fiber holding grooves 520'. Owing to the step 521, the end portion of the optical fibers 200 may be accurately disposed when the optical fibers 200 are mounted. A height of the step 521 may be set corresponding to a total thicknesses of a coating layer and a clad layer of the optical fibers 200, which may prevent loss of light incident on or emitting from the end portion of the optical fibers 200.

Figure 8:
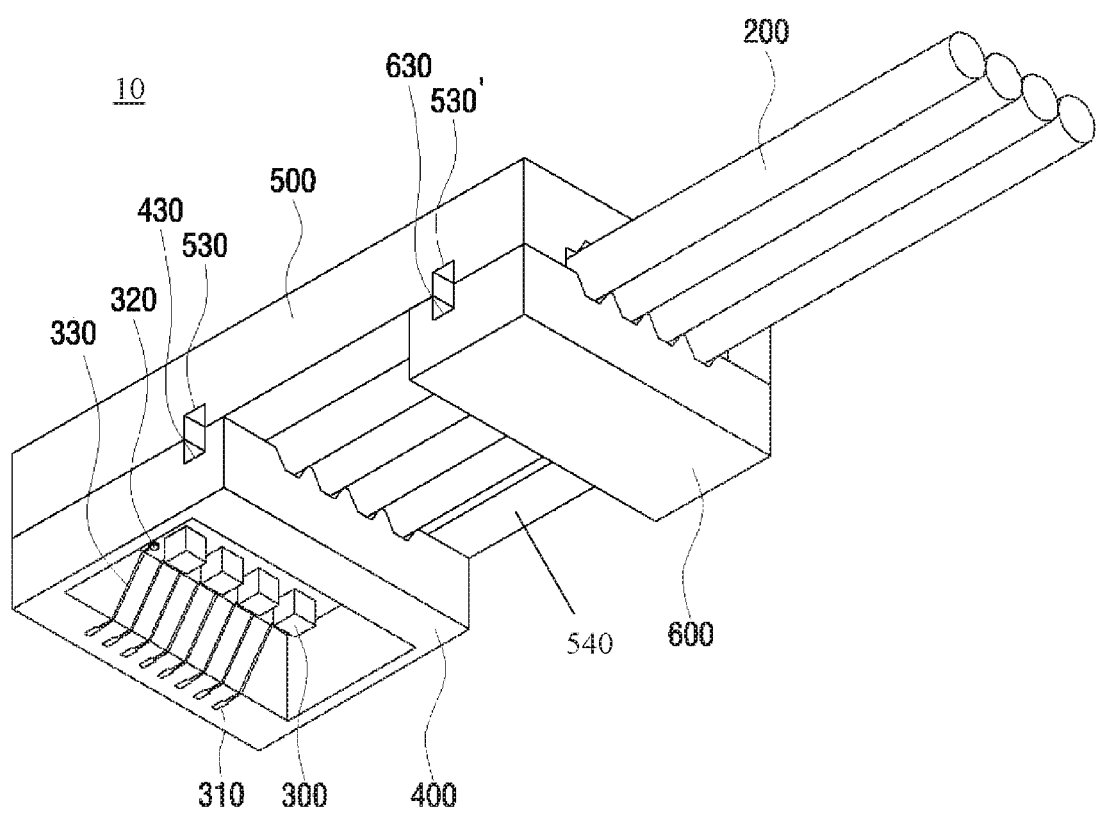
FIG. 8 is a bottom perspective view of the optical module illustrated in FIG. 1.

FIG. 8 is a bottom perspective view partially of the optical module 10 illustrated in FIG. 1. With reference to FIG. 8, a process of manufacturing the optical module 10, according to the principles of the disclosure, will be described below. The optical bench 400, the optical fiber alignment block 500, and the optical fiber fixing block 600, which may be manufactured individually as described above, may be prepared. The optical fibers 200 may be tailored and cut. The lower surface 540 of the optical fiber alignment block 500 may be placed to become an upper portion, and the optical fibers 200 is disposed thereon. A cut surface of the optical fibers 200 may be disposed to be in place using, for example, the step 521 shown in FIG. 7. Alternatively, a position for the cut surface of the optical fibers 200 may be marked at the optical fiber alignment block 500 during the manufacturing thereof, and the cut surface of the optical fibers 200 may be disposed at the position using the mark.

Next, the optical fiber fixing block 600 may be aligned with and coupled to an end portion of the optical fiber alignment block 500, and may then be fixed by, for example, injecting an adhesive through the adhesive injection grooves 530' (shown in FIG. 4) and 630 (shown in FIG. 5) and subsequently curing the adhesive. The optical bench 400 may be prepared by aligning and placing the optical devices 300 to cover the through holes 421, respectively, using, for example, a flip-chip process or the like. The optical bench 400 may then be attached to the substrate 100 using, for example, a die bonding process or the like. The optical fiber alignment block 500, to which the optical fibers 200 and the optical fiber fixing block 600 are attached, may then be attached to the optical bench 400. Subsequently, an adhesive may be injected through the adhesive injection grooves 430, 530. The injected adhesive may be cured, thereby fixing all the components together. The adhesive injected via the adhesive injection grooves 430, 530, 530', and 630 may be spread to the optical fibers 200 by, for example, the capillary action, thereby fixing the optical fibers 200 to the mounting grooves 450 and the holding grooves 520 and 620. The optical modules 10' and 10" shown in FIGS. 6 and 7, respectively, may be manufactured in a similar manner.

With this manufacturing process, the optical modules 10, 10', 10" may be manufactured without performing wire bonding process between the IC device 110 and the optical devices 300 since the optical bench 400 is coupled to the substrate 100 using a flip-chip bonding process after the optical devices 300 is attached to the optical bench 400. Also, a larger bandwidth may be obtained for high-speed communication, and the manufacturing time may be shortened. In addition, the optical devices 300 may be protected during the manufacturing process since the optical devices 300 are mounted on the optical bench 400 prior to the manufacturing process.

Accordingly, the disclosure provides an optical module with improved optical coupling efficiency between components. In addition, the produce defect rate may be reduced since the alignment process tolerance may be remarkably improved down to a micrometer scale. In addition, the optical alignment may be simplified, which may simplify the entire manufacturing process, and the optical module may be miniaturized, slim, shortened, and lightened, thereby reducing the manufacturing cost.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claim, drawings and attachment. The examples provided herein are merely illustrative and are not meant to be an exhaustive list of all possible designs, embodiments, applications or modifications of the disclosure.

What is claimed is:

1. An optical module, comprising:
   a substrate;
   an optical fiber bench attached to the substrate;
   one or more optical fibers, each having an end placed on the optical bench;
   one or more optical devices attached to the optical bench and in optical communication with the one or more fibers, respectively;

an optical fiber alignment block attached to the optical fiber bench with the one or more optical fibers therebetween and comprising a reflecting surface that deflects an optical path between the one or more optical fibers and the one or more optical devices;

one or more mounting grooves formed at an upper surface of the optical bench, wherein the one or more optical fiber are placed on the one or more mounting grooves, respectively;

a groove portion formed at a lower surface of the optical bench; and one or more through holes extending between the one or more mounting grooves and the groove portion, wherein the one or more optical devices are placed at the one or more through hole, respectively, in the groove portion.

2. The optical module of claim 1, wherein the optical fiber alignment block comprising:

one or more first holding grooves formed corresponding to the one or more mounting grooves, respectively, at a lower surface of the optical fiber alignment block; and an optical groove portion connected to the one or more first holding grooves and comprising the reflecting surface, wherein the reflecting surface faces cut surfaces of the one or more optical fibers.

3. The optical module of claim 2, wherein the reflecting surface is configured to deflect the optical path between the one or more optical fibers and the one or more optical devices at an angel of about 90°.

4. The optical module of claim 2, wherein the optical bench further comprises:

a plurality of first electrodes electrically connected to the IC device;

a plurality of second electrodes formed at the groove portion and electrically connected to the one or more optical devices; and a plurality of wires extending between the plurality of first electrodes and the plurality of second electrodes, respectively.

5. The optical module of claim 1, wherein the one or more optical devices are electrically connected to the plurality of second electrodes, respectively, via flip-chip bonding.

6. The optical module of claim 2, wherein the optical bench includes a first adhesive injection groove extending in a direction perpendicular to the mounting groove, and wherein the optical fiber alignment block includes a second adhesive injection groove formed corresponding to the first adhesive injection groove of the optical bench.

7. The optical module of claim 2, wherein, in the optical fiber alignment block, the holding groove is positioned lower than that the one or more optical groove portions, to form a step.

8. The optical module of claim 2, further comprising an optical fiber fixing block attached to the lower surface of the optical fiber alignment block.

9. The optical module of claim 8, wherein the optical bench is longer than the optical fiber alignment block in a length direction of the optical fibers.

10. The optical module of claim 8, wherein the optical fiber alignment block further comprises a third adhesive injection groove, and wherein the optical fiber fixing block comprises:

one or more second holding grooves formed corresponding to the one or more first holding grooves of the optical fiber alignment block; and a fourth adhesive injection groove formed corresponding to the third adhesive injection groove.

11. The optical module of claim 10, further comprising an adhesive inserted into the first, second, third and fourth adhesive injection grooves.

\* \* \* \* \*